(12) United States Patent
Itagaki

(10) Patent No.: US 10,129,441 B2
(45) Date of Patent: Nov. 13, 2018

(54) IMAGE FORMING APPARATUS FOR FORMING TEST PATTERN ON SHEET USING COLORING MATERIAL OF PLURALITY OF COLORS

(71) Applicant: CANON KABUSHIKI KAISHA, Tokyo (JP)

(72) Inventor: Tomohisa Itagaki, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/950,092

(22) Filed: Apr. 10, 2018

(65) Prior Publication Data
US 2018/0234593 A1  Aug. 16, 2018

Related U.S. Application Data

(63) Continuation of application No. 15/217,720, filed on Jul. 22, 2016, now Pat. No. 9,973,660.

(30) Foreign Application Priority Data

Aug. 10, 2015  (JP) ................................ 2015-158497

(51) Int. Cl.
*H04N 1/00*  (2006.01)
*H04N 1/60*  (2006.01)
(Continued)

(52) U.S. Cl.
CPC ....... *H04N 1/6041* (2013.01); *G03G 15/0131* (2013.01); *G03G 15/5062* (2013.01);
(Continued)

(58) Field of Classification Search
None
See application file for complete search history.

(56) References Cited

U.S. PATENT DOCUMENTS 5,828,781 A   10/1998  Nakano .................... 382/167
6,474,767 B1  11/2002  Teshigawara et al. ......... 347/19
(Continued)

FOREIGN PATENT DOCUMENTS

JP   H06-328826   11/1994
JP   H11-11718    1/1999
(Continued)

*Primary Examiner* — Madelein T Nguyen
(74) *Attorney, Agent, or Firm* — Fitzpatrick, Cella, Harper & Scinto

(57) ABSTRACT

The image forming apparatus includes: a measuring unit configured to measure reflected light from a test sheet, the measuring unit including a first sensor and a second sensor, a generation unit configured to generate information regarding a color of a plurality of measurement images based on a measurement result by the measuring unit; and a detection unit configured to detect a sensor that has output an abnormal measurement result in the measuring unit, based on the measurement result. The detection unit is further configured to detect a sensor that has output the abnormal measurement result, based on measurement results obtained by the measuring unit regarding reflected light from a predetermined region of the test sheet. The predetermined region corresponds to a region on which the plurality of measurement images are not formed.

9 Claims, 12 Drawing Sheets

(51) Int. Cl.
*G03G 15/00* (2006.01)
*G03G 15/23* (2006.01)
*G03G 15/01* (2006.01)

(52) U.S. Cl.
CPC ......... *G03G 15/55* (2013.01); *H04N 1/00005* (2013.01); *H04N 1/00023* (2013.01); *H04N 1/00034* (2013.01); *H04N 1/00058* (2013.01); *H04N 1/00082* (2013.01); *H04N 1/6033* (2013.01); *G03G 15/0189* (2013.01); *G03G 15/234* (2013.01); *G03G 2215/00569* (2013.01)

(56) References Cited

U.S. PATENT DOCUMENTS

| | | | | |
|---|---|---|---|---|
| 6,532,026 | B2 | 3/2003 | Takahashi et al. | 347/47 |
| 6,547,360 | B2 | 4/2003 | Takahashi et al. | 347/19 |
| 6,697,167 | B1 | 2/2004 | Takahashi | 358/1.9 |
| 6,959,157 | B2 | 10/2005 | Nakayama | 399/39 |
| 7,509,065 | B2 | 3/2009 | Itagaki | 399/49 |
| 9,057,646 | B2 | 6/2015 | Furuta | G01J 3/462 |
| 9,335,256 | B2 | 5/2016 | Takemura | G01N 21/27 |
| 9,444,974 | B2 | 9/2016 | Omagari et al. | H04N 1/6033 |
| 9,983,514 | B2 * | 5/2018 | Yamamoto | G03G 15/5058 |
| 2004/0042807 | A1 | 3/2004 | Nakayama | 399/49 |
| 2006/0198648 | A1 | 9/2006 | Itagaki | 399/49 |
| 2007/0201066 | A1 | 8/2007 | Ziv | 358/1.9 |
| 2007/0291291 | A1 | 12/2007 | Vilar et al. | 358/1.9 |
| 2009/0121162 | A1 | 5/2009 | Mizes et al. | 250/559.1 |
| 2011/0103815 | A1 | 5/2011 | Hanashi | 399/49 |
| 2011/0217052 | A1 * | 9/2011 | Usui | G03G 15/00 399/15 |
| 2012/0150471 | A1 | 6/2012 | Muto | 702/104 |
| 2013/0011153 | A1 * | 1/2013 | Toriyabe | G03G 15/0189 399/49 |
| 2013/0016352 | A1 | 1/2013 | Kita et al. | 356/402 |
| 2013/0027722 | A1 | 1/2013 | Tomita | 358/1.9 |
| 2013/0135650 | A1 | 5/2013 | Kuronuma | 358/1.13 |
| 2013/0156445 | A1 * | 6/2013 | Takemura | G03G 15/2039 399/15 |
| 2013/0162998 | A1 * | 6/2013 | Furuta | G01J 3/462 356/402 |
| 2013/0222859 | A1 * | 8/2013 | Uratani | G06K 15/027 358/3.24 |
| 2013/0243451 | A1 | 9/2013 | Hirota et al. | 399/39 |
| 2013/0286080 | A1 * | 10/2013 | Uchida | B41J 29/393 347/19 |
| 2013/0321887 | A1 | 12/2013 | Noffke | 358/514 |
| 2014/0050496 | A1 * | 2/2014 | Furuta | G01J 3/46 399/49 |
| 2014/0112672 | A1 * | 4/2014 | Itagaki | G03G 15/5062 399/15 |
| 2014/0185114 | A1 * | 7/2014 | Takemura | H04N 1/60 358/504 |
| 2014/0226192 | A1 | 8/2014 | Takemura | G01N 21/27 |
| 2015/0002907 | A1 * | 1/2015 | Ukishima | G06K 15/1868 358/3.24 |
| 2016/0373603 | A1 | 12/2016 | Ooishi | H04N 1/00984 |
| 2017/0038716 | A1 * | 2/2017 | Itagaki | G03G 15/5058 |
| 2017/0048423 | A1 * | 2/2017 | Itagaki | H04N 1/6041 |
| 2017/0054878 | A1 | 2/2017 | Takemura | H04N 1/6041 |
| 2017/0102631 | A1 | 4/2017 | Hirota et al. | G03G 15/01 |

FOREIGN PATENT DOCUMENTS

| | | |
|---|---|---|
| JP | H11-75067 | 3/1999 |
| JP | 2004-086013 | 3/2004 |
| JP | 2006-243276 | 9/2006 |
| JP | 2009-004865 | 1/2009 |
| JP | 2013-134450 | 7/2013 |
| JP | 2014-158116 | 8/2014 |
| JP | 2014-170195 | 9/2014 |

\* cited by examiner

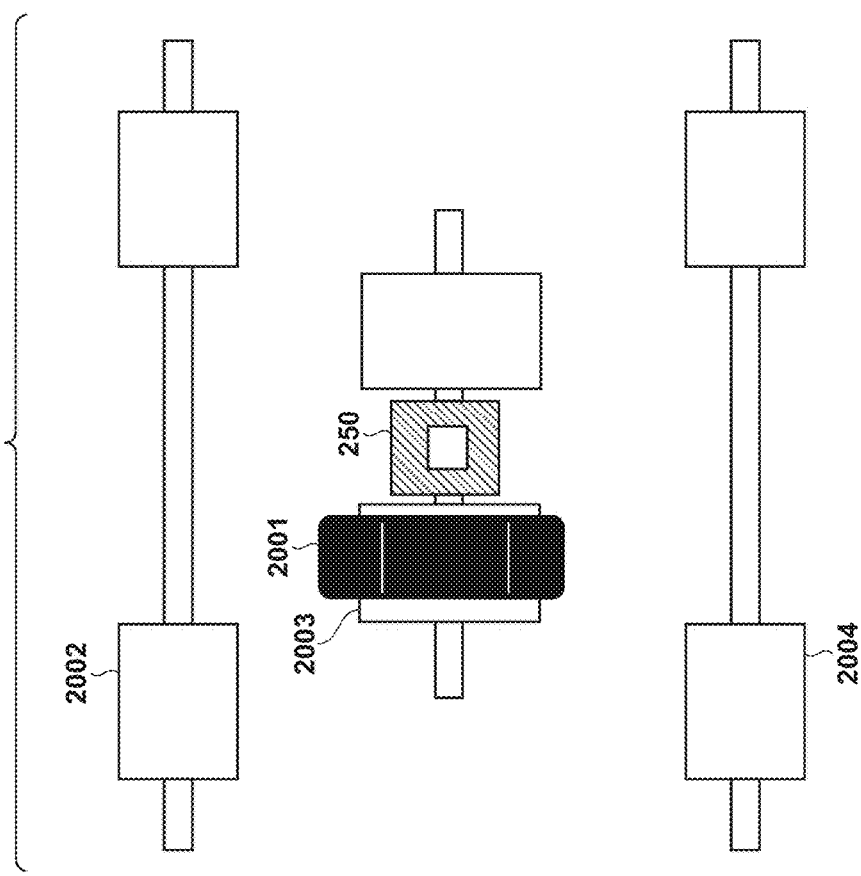
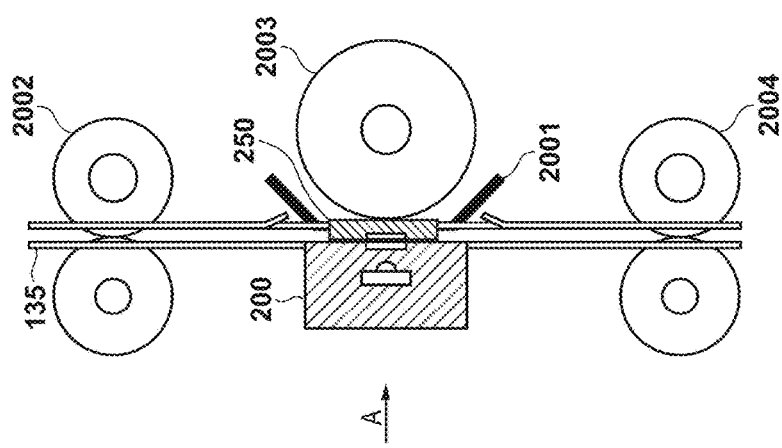

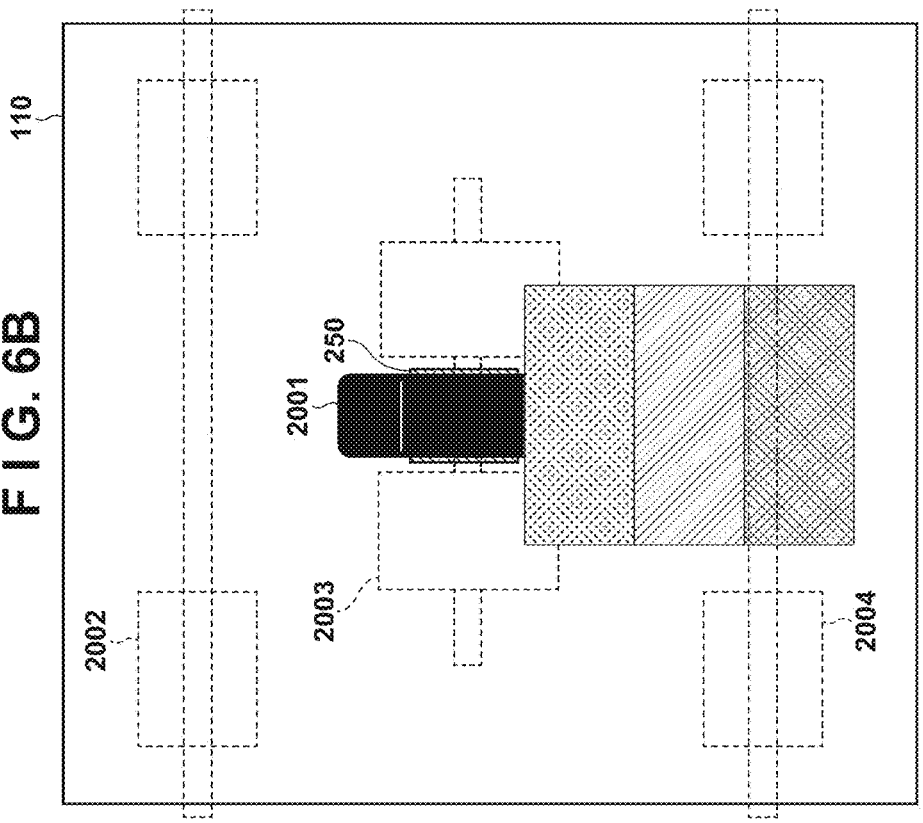
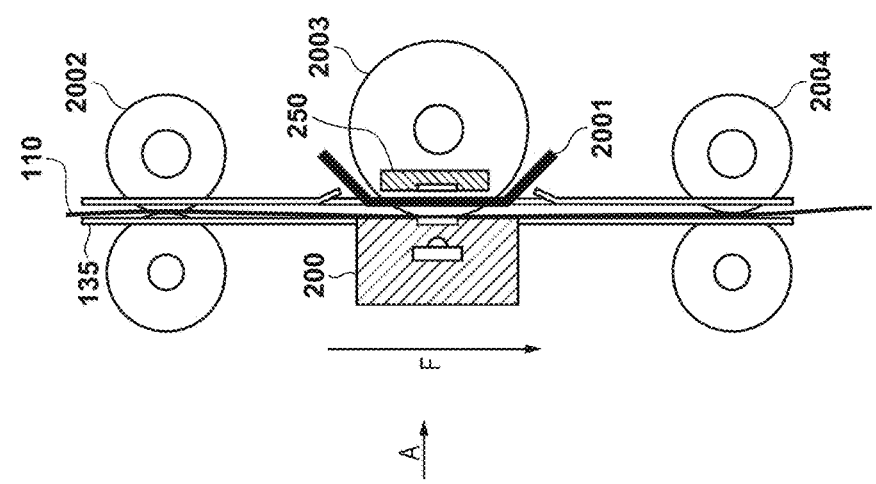

FIG. 7A FIG. 7B FIG. 7C

FIG. 9A
FIG. 9B
|      | CYAN | MAGENTA | YELLOW | BLACK | NOTES |
|------|------|---------|--------|-------|-------|
| C#1  | 40%  | 0%      | 40%    | 0%    | GREEN: SECOND QUADRANT |
| #2   | 0%   | 0%      | 0%     | 0%    | WHITE |
| C#2  | 0%   | 40%     | 40%    | 0%    | RED: FIRST QUADRANT |
FIG. 9C
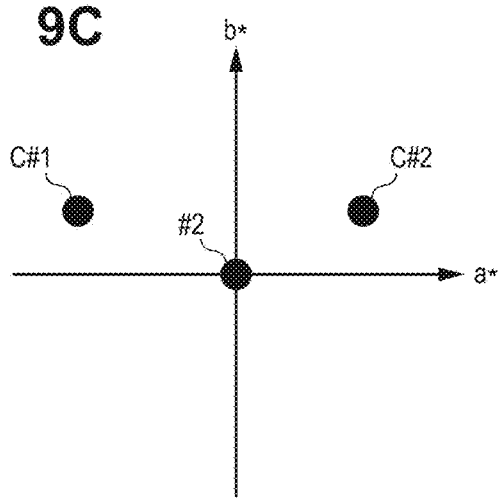

FIG. 10

| COLOR DETECTION SENSOR | AUTOMATIC TONE CORRECTION | AUTOMATIC COLOR TONE CORRECTION | UNEVEN DENSITY CORRECTION |
|---|---|---|---|
| | DENSITY CALCULATION | Lab CALCULATION | DENSITY CALCULATION |
| CORRECTION SUBJECT | MONOCHROMATIC LUT | MULTI-COLOR LUT | LIGHT INTENSITY TABLE |

F I G. 11

| TEST PURPOSE | TEST CONTENT | CONDITIONS |
|---|---|---|
| INTRA-SHEET DIFFERENCE | COLOR DIFFERENCE BETWEEN #1 AND #3 | 1.6 OR LESS |
| INTER-SHEET DIFFERENCE | COLOR DIFFERENCE BETWEEN #6 AND #10 | 1.6 OR LESS |
| | COLOR DIFFERENCE BETWEEN #7 AND #11 | |
| | COLOR DIFFERENCE BETWEEN #8 AND #12 | |
| | COLOR DIFFERENCE BETWEEN #9 AND #13 | |
| INTER-SENSOR DIFFERENCE | COLOR DIFFERENCE BETWEEN AVERAGE VALUE OF COLOR VALUES OF #2 TO #13 AND AVERAGE VALUE OF COLOR VALUES OF #2, #6, AND #10 | 0.8 OR LESS |
| | COLOR DIFFERENCE BETWEEN AVERAGE VALUE OF COLOR VALUES OF #2 TO #13 AND AVERAGE VALUE OF COLOR VALUES OF #3, #7, AND #11 | |
| | COLOR DIFFERENCE BETWEEN AVERAGE VALUE OF COLOR VALUES OF #2 TO #13 AND AVERAGE VALUE OF COLOR VALUES OF #4, #8, AND #12 | |
| | COLOR DIFFERENCE BETWEEN AVERAGE VALUE OF COLOR VALUES OF #2 TO #13 AND AVERAGE VALUE OF COLOR VALUES OF #5, #9, AND #13 | |
| LARGEST COLOR DIFFERENCE | COLOR DIFFERENCE BETWEEN AVERAGE VALUE OF COLOR VALUES OF #1 TO #13 AND EACH OF COLOR VALUES OF #1 TO #13 | 0.8 OR LESS |

FIG. 12

| RESULT | CAUSE | DISPLAY CONTENT |
|---|---|---|
| SECOND QUADRANT SIDE | LOW CONVEYANCE SPEED | CHECK CONVEYANCE ROLLER |
| FIRST QUADRANT SIDE | HIGH CONVEYANCE SPEED | CHECK CONVEYANCE ROLLER |
| LOW LIGHTNESS | OCCURRENCE OF FLAPPING DURING CONVEYANCE | CHECK BACKUP ROLLER |

# IMAGE FORMING APPARATUS FOR FORMING TEST PATTERN ON SHEET USING COLORING MATERIAL OF PLURALITY OF COLORS

This application is a continuation of application Ser. No. 15/217,720 filed Jul. 22, 2016, currently pending; and claims priority under 35 U.S.C. § 119 to Japan Application 2015-158497 filed in Japan on Aug. 10, 2015; and the contents of all of which are incorporated herein by reference as if set forth in full.

BACKGROUND OF THE INVENTION

Field of the Invention

The present invention relates to stabilization control for images formed by image forming apparatuses.

Description of the Related Art

Color reproducibility is important for image forming apparatuses. In order to improve color reproducibility, US 2006/198648 discloses a configuration in which the density of an image formed on a sheet is detected by a reader unit in an image forming apparatus, which is a copying machine, and image forming conditions are controlled. US 2006/198648 discloses a configuration in which an RGB sensor is provided in the image forming apparatus, and an image formed on a sheet is read by the RGB sensor to control the image forming conditions. Furthermore, US 2004/042807 discloses a configuration in which image forming conditions are controlled using a spectral reflectance sensor, which has a wider reading area and higher accuracy than those of an RGB sensor. The configurations described in US 2006/198648 and US 2004/042807 are for detecting an image formed on a sheet while conveying the sheet in the image forming apparatus. However, if a sheet that is being conveyed flaps, reflected light from the sheet varies and the adjustment accuracy of the image forming conditions is affected. Japanese Patent Laid-Open No. 11-11718 discloses an image forming apparatus that has a detection unit for detecting flapping of a sheet.

With the configuration described in Japanese Patent Laid-Open No. 11-11718, a space for providing the detection unit for detecting flapping of a sheet is required, and moreover, the provision of this detection unit increases cost. Furthermore, when performing colorimetric measurement on an image on a sheet that is being conveyed, not only flapping of the sheet but also unevenness in the sheet conveyance speed affect the measurement accuracy. For example, if, at a colorimetric measurement timing for an image, colorimetric measurement is performed on a part of the previous image or the next image due to the unevenness in the conveyance speed, a difference in tone called a tone jump occurs under an image forming condition that is based on the result of this colorimetric measurement. Moreover, in the case of performing colorimetric measurement on a large number of colors in order to create a multi-color lookup table (LUT), colorimetric measurement needs to be performed on an image with more than 200 colors. The number of sensors needs to be increased to perform colorimetric measurement on an image with such a large number of colors, but in this case, a tone jump occurs due to a difference in reading accuracy among the sensors.

SUMMARY OF THE INVENTION

According to an aspect of the present invention, an image forming apparatus includes: an image forming unit configured to form an image on a sheet; a conveyance unit configured to convey the sheet along a conveyance path; a measuring unit configured to measure reflected light from a test sheet conveyed by the conveyance unit, the measuring unit including a first sensor and a second sensor, the second sensor being provided at a position different from a position of the first sensor in a direction perpendicular to a conveyance direction in which the sheet is conveyed by the conveyance unit; a controller configured to control the image forming unit to form, on the sheet, a plurality of measurement images for creating the test sheet, control the conveyance unit to convey the test sheet, and control the measuring unit to measure the reflected light from the test sheet; a generation unit configured to generate information regarding a color of the plurality of measurement images based on a measurement result obtained by the measuring unit; and a detection unit configured to detect a sensor that has output an abnormal measurement result in the measuring unit, based on measurement results obtained by the measuring unit regarding reflected light from a predetermined region of the test sheet. The predetermined region corresponds to a region on which the plurality of measurement images are not formed.

Further features of the present invention will become apparent from the following description of exemplary embodiments with reference to the attached drawings.

BRIEF DESCRIPTION OF THE DRAWINGS

FIGS. 5A and 5B are diagrams showing a configuration at the periphery of the color detection sensor at the time of white reference plate measurement according to an embodiment.

FIGS. 6A and 6B are diagrams showing a configuration at the periphery of the color detection sensor at the time of colorimetric measurement according to an embodiment.

FIGS. 7A to 7C are diagrams showing a test pattern according to an embodiment.

FIGS. 9A to 9C are diagrams illustrating a coloring material used in patches of a test pattern according to an embodiment.

FIG. 10 is a diagram showing values to be calculated and items to be corrected in respective corrections.

FIG. 11 is a diagram showing an allowable range for color differences according to an embodiment.

FIG. 12 is a diagram showing content to be displayed on the operation panel according to an embodiment.

DESCRIPTION OF THE EMBODIMENTS

Hereinafter, exemplary embodiments of the present invention will be described with reference to the drawings. Note that the following embodiments are examples, and are not intended to limit the present invention to the content of the embodiments. Constituent elements that are not necessary for the description of the embodiments are omitted in the diagrams used below.

First Embodiment

Figure 1:
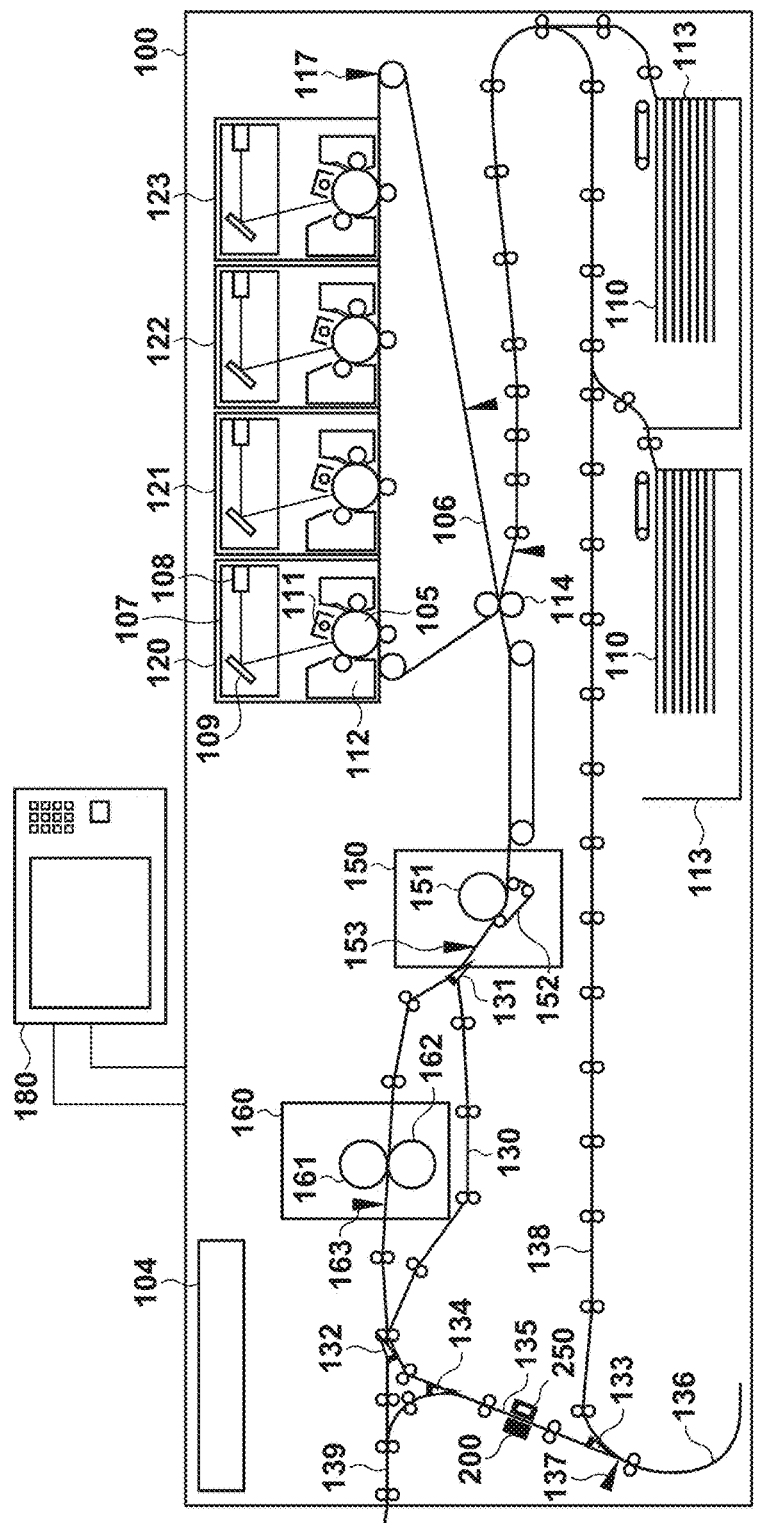
FIG. 1 is a diagram showing a configuration of an image forming apparatus according to an embodiment.
Figure 2:
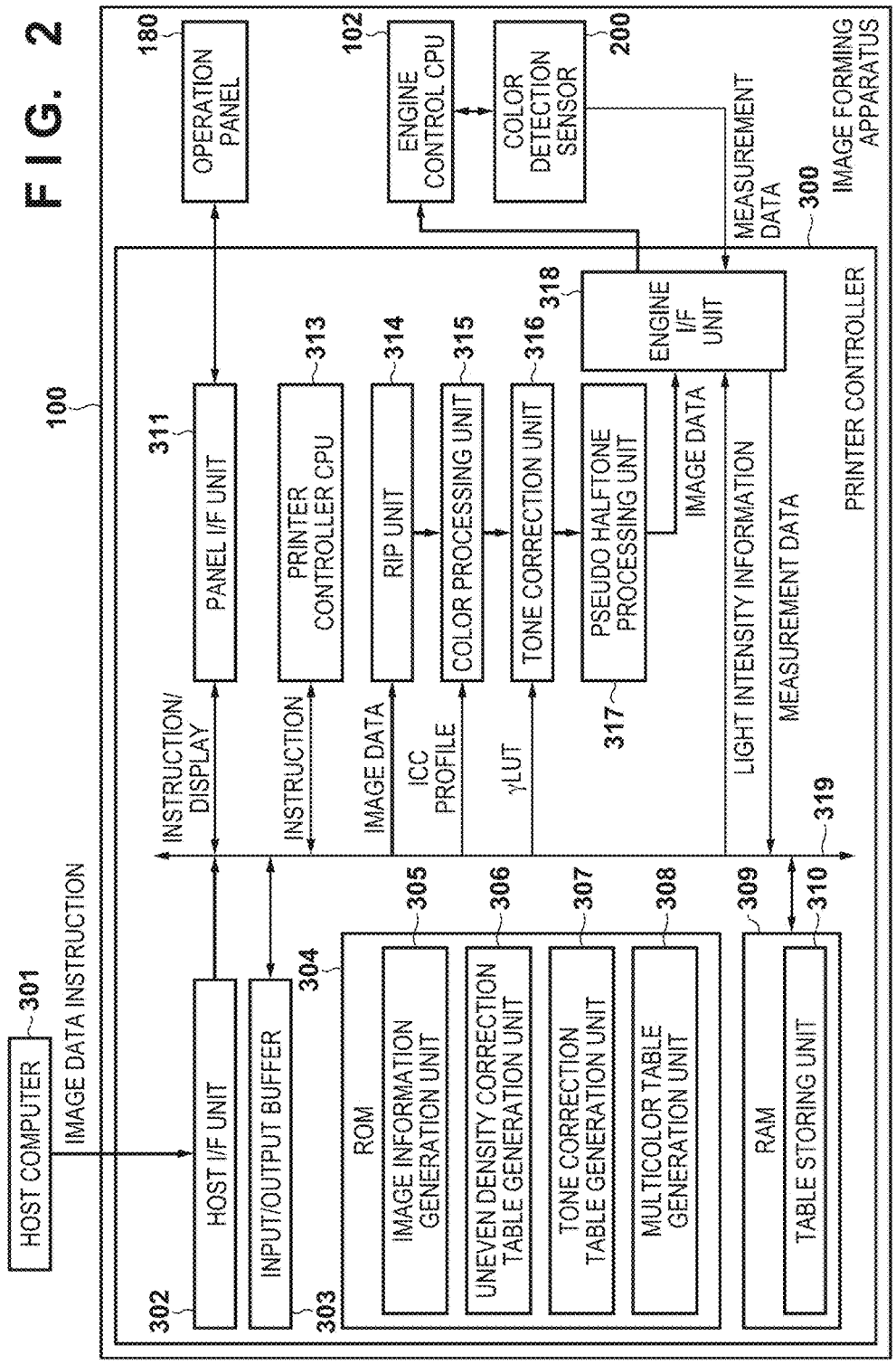
FIG. 2 is a diagram showing a control configuration of the image forming apparatus according to an embodiment.

This embodiment will be described below regarding an electrophotographic image forming apparatus. However, the present invention is also applicable to inkjet and sublimation image forming apparatuses. FIG. 1 is a cross-sectional diagram showing a structure of an image forming apparatus 100 according to this embodiment. An engine control CPU 102 and a printer controller 300 that performs image processing and the like, which are shown in FIG. 2, are housed in a control board housing unit 104 of the image forming apparatus 100. Note that these control processes (e.g., paper feed processing) related to image formation. Four stations 120, 121, 122, and 123 respectively form yellow, cyan, magenta, and black toner images on an intermediate transfer member 106. The four stations 120, 121, 122, and 123 have the same configuration except for the toner colors that the respective stations use. A photosensitive member 105 is a kind of image carrier, and is rotationally driven when forming an image. A charging unit 111 charges a surface of the photosensitive member 105 at a uniform potential. An exposure unit 107 scans and exposes the charged photosensitive member 105 using light that is output by a light source 108 and corresponds to an image to be formed, and forms a latent image on the photosensitive member 105. A development unit 112 develops the latent image using toner, which is a coloring material, to form a toner image. This toner image is primarily transferred onto the intermediate transfer member 106. A transfer roller 114 secondarily transfers the toner image formed on the intermediate transfer member 106 onto a sheet 110 that has been conveyed from a tray 113. In this manner, the four stations, the intermediate transfer member 106, and the transfer roller 114 function as a formation unit that forms an image on the sheet 110 using a plurality of coloring materials.

A fixing processing mechanism in the image forming apparatus 100 according to this embodiment has a first fixing unit 150 and a second fixing unit 160 that heat and press the toner image, which has been transferred onto the sheet 110, to fix the toner image onto the sheet 110. The first fixing unit 150 includes a fixing roller 151 for heating the sheet 110, a pressure belt 152 for pressing the sheet 110 against the fixing roller 151, and a first post-fixing sensor 153 that detects completion of the fixing. The second fixing unit 160 is arranged on the downstream side of the first fixing unit 150 in the conveyance direction of the sheet 110. The second fixing unit 160 adds gloss to the toner image on the sheet 110 fixed by the first fixing unit 150, and ensures the fixability. Similar to the first fixing unit 150, the second fixing unit 160 also has a fixing roller 161, a pressure roller 162, and a second post-fixing sensor 163. Depending on the type of sheet 110, the sheet does not need to pass through the second fixing unit 160. In this case, in order to reduce energy consumption, the sheet 110 passes through a conveyance path 130 without passing through the second fixing unit 160. A conveyance path switching flapper 131 switches between guiding the sheet 110 to the conveyance path 130 and guiding the sheet 110 to the second fixing unit 160.

A conveyance path switching flapper 132 is a guiding member that guides the sheet 110 to a conveyance path 135 leading to an inversion unit 136 or guides the sheet 110 to a discharge path 139 leading to the outside. An inversion sensor 137 is provided in the conveyance path 135. A leading end of the sheet 110 passes through the inversion sensor 137, and the sheet 110 is conveyed to the inversion unit 136. Upon the inversion sensor 137 detecting a trailing end of the sheet 110, the conveyance direction of the sheet 110 is switched. A conveyance path switching flapper 133 is a guiding member that guides the sheet 110 to a conveyance path 138 for two-sided image formation, or guides the sheet 110 to the conveyance path 135. A conveyance path switching flapper 134 is a guiding member that guides the sheet 110 to the discharge path 139 leading to the outside. Note that a large number of conveyance rollers are provided in the conveyance paths including the conveyance path 135 and the discharge path 139.

A color detection sensor 200 that detects a test pattern formed on the sheet 110 is arranged downstream of the second fixing unit 160 in the conveyance direction of the sheet 110. In this embodiment, the color detection sensor 200 is a spectral reflectance sensor that irradiates the test pattern with light and detects a spectral reflectance of the reflected light. Note that a white reference plate 250 is provided on the side opposite to the color detection sensor 200 relative to the conveyance path 135. The color detection sensor 200 functions as a colorimetric measurement unit that performs colorimetric measurement on a color of the image fixed on the sheet 110, downstream of the first fixing unit 150 and the second fixing unit 160 in the conveyance direction of the sheet 110. The color detection sensor 200 may be arranged in the discharge path 139. An operation panel 180 functions as an input/output unit from which a user inputs an instruction to the image forming apparatus, and that displays a state of the image forming apparatus to the user, for example.

FIG. 2 is a diagram showing a control configuration of the image forming apparatus 100 according to the present embodiment. A host computer 301 is a computer that transmits a print job to the image forming apparatus 100 via a wired or wireless communication line. The printer controller 300 operates in conjunction with the engine control CPU 102 to control the operation of the image forming apparatus 100. Units that constitute the printer controller 300 are connected to one another via a bus 319.

A host I/F unit 302 is a communication unit that manages input and output to/from the host computer 301. An input/output buffer 303 stores a control code from the host I/F unit 302 and accumulates data from communication units. A printer controller CPU 313 is the main processor that comprehensively controls overall operation of the image forming apparatus 100. A ROM 304 is a memory that stores a control program and control data of the printer controller CPU 313. Functions achieved by the printer controller CPU 313 executing this control program include, for example, an image information generation unit 305, an uneven density correction table generation unit 306, a tone correction table generation unit 307, a multi-color table generation unit 308, and the like.

The tone correction table generation unit 307 generates and updates a tone correction table (γLUT), which contains correction conditions for adjusting monochromatic tones through automatic tone correction. The multi-color table generation unit 308 generates and updates a multi-color LUT, which contains correction conditions for color correction, that is, an ICC profile, through automatic hue correction. Furthermore, the uneven density correction table generation unit 306 generates and updates a light intensity table through uneven density correction. Note that the uneven density correction is a control for correcting the light intensity of the light source 108 in order to correct the uneven density in the main scanning direction.

A RAM 309 is a memory that is used as a work area for interpreting the control code and data, performing calculation necessary for printing, or processing print data, and a table storing unit 310 is provided therein. The ICC profile generated by the multi-color table generation unit 308, the tone correction table created by the tone correction table generation unit 307, and a light intensity table created by the uneven density correction generation unit 306 are stored in the table storing unit 310. An image information generation unit 305 generates various image objects (a test pattern etc.) in accordance with setting information received from the host computer 301. A RIP (Raster Image Processor) unit 314 is a processor that expands an image object into a bitmap image. A color processing unit 315 performs color conversion processing in accordance with the ICC profile, which is a color profile generated by the multi-color table generation unit 308. A tone correction unit 316 executes monochromatic tone correction using the tone correction table created by the tone correction table generation unit 307. A pseudo halftone processing unit 317 performs pseudo halftone processing, such as dither matrix and an error diffusion method, on image data. An engine I/F unit 318 is a communication unit that transfers image data and light intensity information indicated by the light intensity table to the engine control CPU 102. The engine control CPU 102 controls the four stations 120, 121, 122, and 123, and the like to form an image in accordance with the image data.

Figure 3:
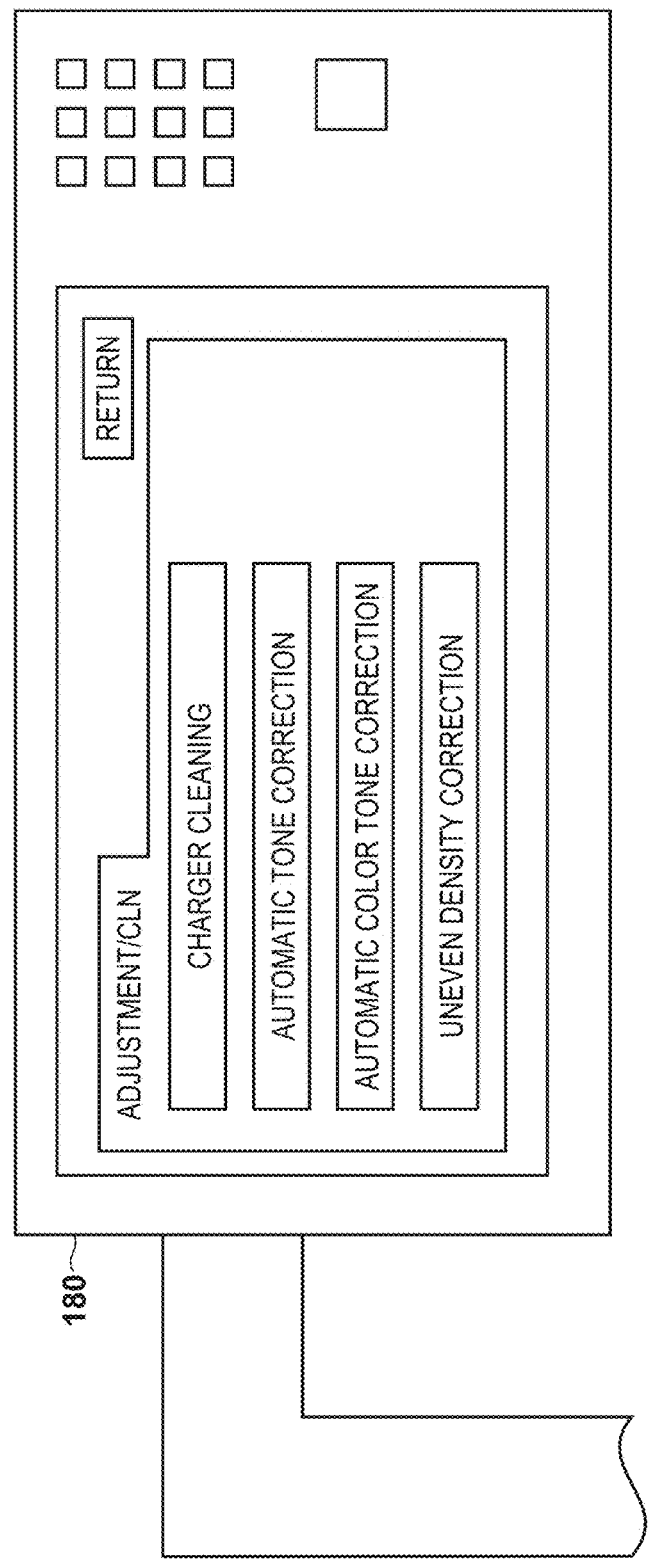
FIG. 3 is a diagram showing an operation panel according to an embodiment.

The operation panel 180 is constituted by a display device and an input device, accepts input of instructions to execute printing and correction processing, and displays information to the user, for example. FIG. 3 is an exemplary screen displayed by the operation panel 180. FIG. 3 shows a screen that is displayed when the user selects "adjustment/CLN (cleaning)", which relates to the present invention, and automatic tone correction, automatic hue correction, uneven density correction are displayed therein. As a result of the user selecting any of these corrections, the image forming apparatus 100 executes the selected correction control. A panel I/F unit 311 connects the operation panel 180 and the printer controller 300 to each other. Note that the colorimetric measurement result obtained by the color detection sensor 200 is input as measurement data to the printer controller CPU 313. The printer controller CPU 313 manages the ICC profile, the tone correction table, and the light intensity table that are used when forming an image and updates them based on the measurement data as necessary, thereby enabling a desired color to be output.

Figure 4:
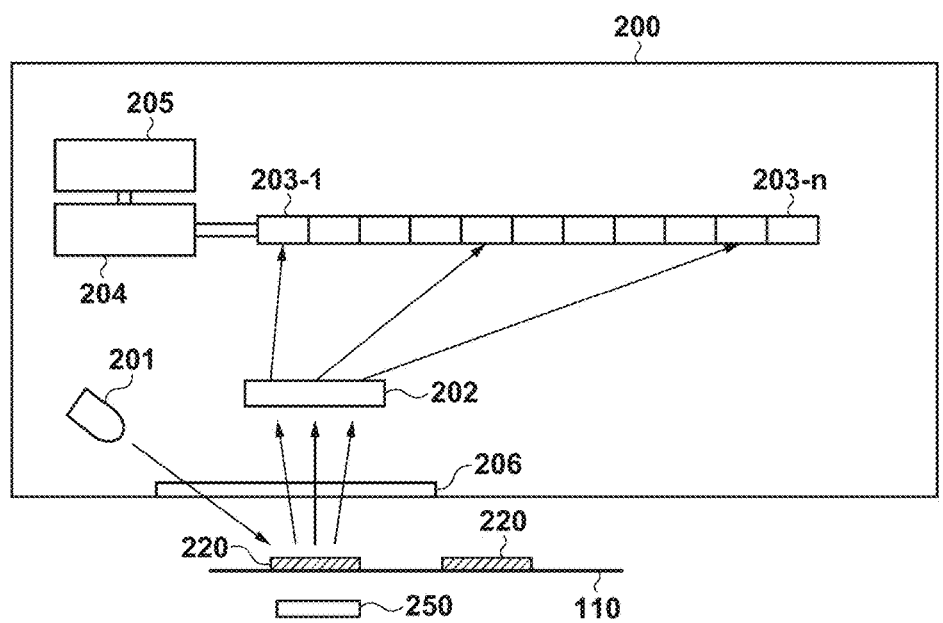
FIG. 4 is a diagram showing a configuration of a color detection sensor according to an embodiment.

FIG. 4 is a diagram showing a configuration of the color detection sensor 200. A white LED 201 is a light-emitting device that irradiates a test pattern 220 on the sheet 110 with light. A diffraction grating 202 is a spectral component that diffracts light reflected from the test pattern 220 for each wavelength. A line sensor 203 is a light detection device that includes n light-receiving devices for detecting light that is spectrally resolved for each wavelength by the diffraction grating 202. A computing unit 204 performs various kinds of computation using light intensity values of respective pixels detected by the light sensor 203. Various data used by the computing unit 204 is saved in a memory 205. Note that a lens 206 that collects light emitted from the white LED 201 onto the test pattern 220 on the sheet 110 and collects light reflected from the test pattern 220 onto the diffraction grating 202 may further be provided. The color detection sensor 200 measures a color of the test pattern on the sheet 110 that is being conveyed by a conveyance unit. The white reference plate 250 is used for adjusting the light intensity of the white LED 201, for example. Note that, in the case of installing a plurality of color detection sensors 200 in the image forming apparatus 100, only one pair of the computing unit 204 and the memory 205 may be provided for the plurality of color detection sensors 200. This is because, with this configuration, processing related to measured values from the plurality of color detection sensors 200 can be executed in an integrated manner, and the load on the printer controller 300 can be reduced. Furthermore, since the number of parts can be reduced, the effect of reducing manufacturing costs can also be demonstrated.

FIGS. 5A, 5B, 6A, and 6B are diagrams illustrating a configuration of the color detection sensor 200. Note that FIGS. 5A and 6A are diagrams as viewed in the same direction as in FIG. 1, and FIGS. 5B and 6B are diagrams as viewed in a direction A indicated in FIGS. 5A and 6A. FIGS. 5A and 5B show a state in the case of calibrating the color detection sensor 200, and FIGS. 6A and 6B shows a state of withdrawing the white reference plate 250 and detecting a test pattern formed on the sheet 110. A backup roller 2003 is arranged between a conveyance roller 2002 and a conveyance roller 2004 in the sheet conveyance direction, similar to the color detection sensor 200. Note that the backup roller 2003 is provided on the side opposite to the color detection sensor 200 relative to the conveyance path 135. The backup roller 2003 abuts against the conveyance path 135 and suppresses flapping of the sheet 110 when the test pattern is measured. Note that a shutter 2001 is for protecting the white reference plate 250 from becoming unclean due to paper powder or the like. When calibrating the color detection sensor 200, in order to cause the color detection sensor 200 to detect reflected light from the white reference plate 250, the printer controller CPU 313 withdraws the shutter 2001 and causes the white reference plate 250 to abut against the conveyance path 135, as shown in FIGS. 5A and 5B. On the other hand, for example, in the case of performing colorimetric measurement on the test pattern, the printer controller CPU 313 withdraws the white reference plate 250, moves the shutter 2001 to a protection position, and causes the backup roller 2003 to abut against the conveyance path 135, as shown in FIGS. 6A and 6B.

The color detection sensor 200 detects 35-band spectral reflectance information bands at intervals of 10 nm with a wavelength of 380 nm to 720 nm, for example. In this embodiment, this spectral reflectance information is converted into information shown in FIG. 10 by the color detection sensor 200 in accordance with the content of correction control. For example, in the automatic tone correction, the spectral reflectance information is converted into a density value via a status A filter and a visual filter, and generates and modifies the tone correction table based on this density value. In the automatic hue correction, the spectral reflectance information is converted into CIE L*a*b* through a color matching function, which is a conversion method in accordance with ISO 13655, and a standard light source D50 (hereinafter referred to as SD50), and generates and modifies the ICC profile, which is a multi-color LUT. Furthermore, in the uneven density correction, the spectral reflectance information is converted into a density value, and the light intensity table is generated and updated so as to correct the uneven density in the main scanning direction.

Test patterns that are used in the automatic tone correction and the uneven density correction according to this embodiment are monochromatic patterns of yellow, cyan, magenta, and black, and each color pattern is formed and detected in one sheet. On the other hand, in the automatic hue correction, since the multi-color LUT is generated and updated, a test pattern that includes many colors, that is, a test pattern that includes multi-color patches formed using multiple types of toner is formed, for example. In this case, even if four color detection sensors 200 are arranged in the main scanning direction, a plurality of sheets are necessary for forming all patches. That is to say, in the automatic tone correction and the uneven density correction, only a difference within one sheet (hereinafter, "intra-sheet difference") affects the correction control. On the other hand, in the automatic hue correction, a difference between sheets (hereinafter, "inter-sheet difference") and characteristic difference between the color detection sensors 200 (hereinafter, "inter-sensor difference"), as well as the intra-sheet difference, affect the correction control.

Figures 7A, 7B, 7C:
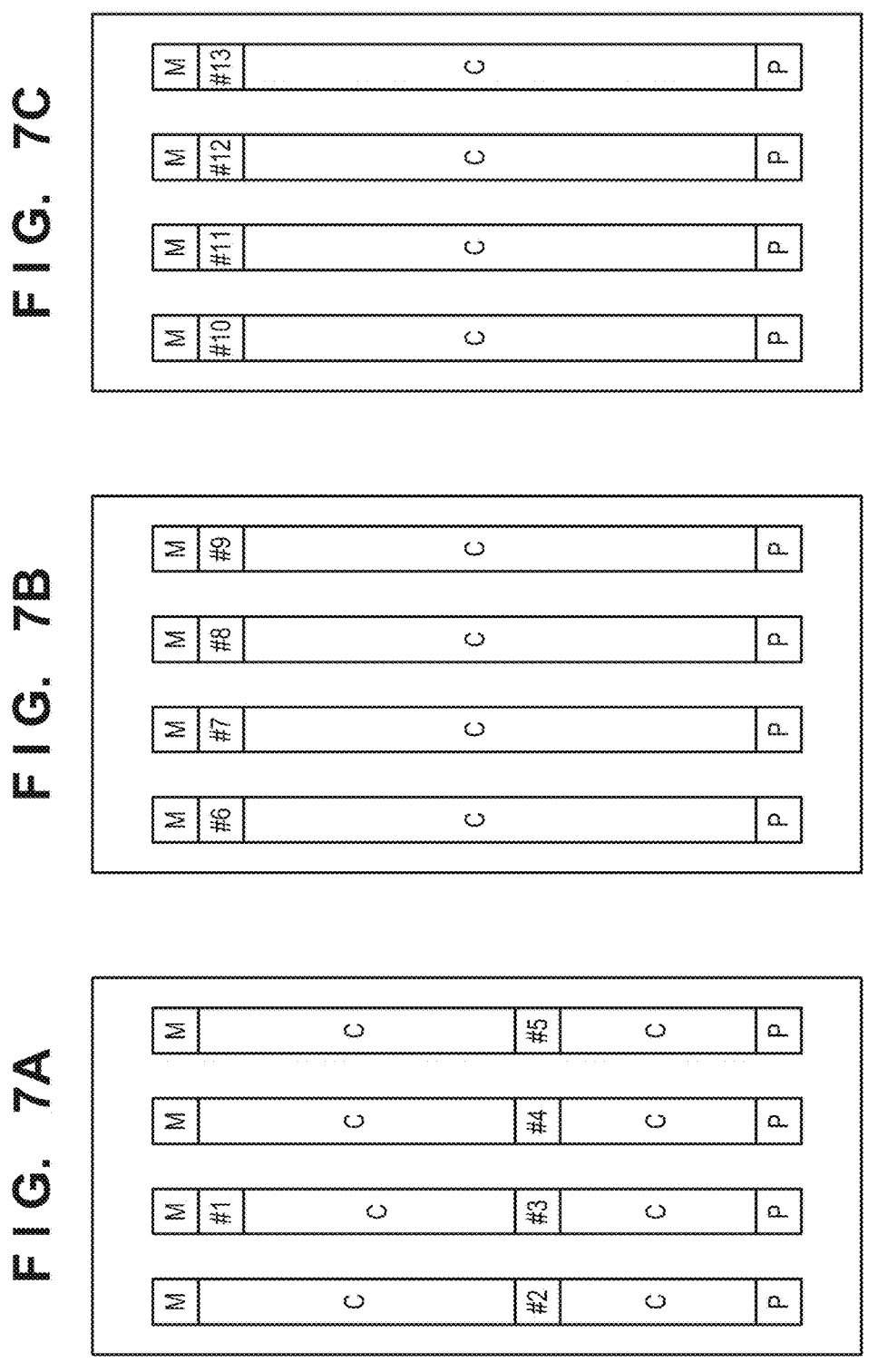

FIGS. 7A to 7C show the test patterns used in the automatic hue correction according to this embodiment. In this example, the test patterns expand over three sheets, and FIGS. 7A, 7B, and 7C respectively show the test patterns formed on the first, second, and third sheets. In this embodiment, four color detection sensors 200 are provided at different positions in the main scanning direction. Accordingly, as shown in FIGS. 7A to 7C, the test patterns formed on the respective sheets each include four columns that correspond to the four color detection sensors 200. In FIGS. 7A to 7C, the test pattern in the left-end column is detected by a first color detection sensor 200 (hereinafter referred to as a sensor SC1), and the test pattern in the next column on the right side thereof is detected by a second color detection sensor 200 (hereinafter referred to as a sensor SC2). Furthermore, the test pattern in the next column on the right side thereof is detected by a third color detection sensor 200 (hereinafter referred to as a sensor SC3), and the test pattern in a right-end column is detected by a fourth color detection sensor 200 (hereinafter referred to as a sensor SC4).

In the test patterns in FIGS. 7A to 7C, "M" denotes a main-scan trigger patch, and "P" denotes a pre-scan trigger patch. "C" denotes a colorimetric measurement patch, and a total of 18 colorimetric measurement patches are included in each column, excluding the test pattern in the second column from the left on the first sheet shown in FIG. 7A. Note that the test pattern in the second column from the left on the first sheet includes a total of 17 colorimetric measurement patches in one column. That is to say, in this embodiment, a total of 215 colorimetric measurement patches, that is, colorimetric measurement patches of 215 colors are formed on the three sheets. Furthermore, in FIGS. 7A to 7C, patches from #1 to #13 are check patches. The check patches are each formed by a white solid signal, that is, a signal of a color signal value of 0%. More specifically, each check patch is not a patch for attaching toner but is a patch that uses a surface of the sheet. Note that in FIGS. 7A to 7C, the check patches #1 and #6 to #13 are formed adjacent to the main-scan trigger patches. On the other hand, the check patches #2 to #5 are arranged between colorimetric measurement patches. For example, in this example, 7 colorimetric measurement patches are arranged between each of the check patches #2 to #5 and the corresponding pre-scan trigger patch.

Note that the test patterns in FIGS. 7A to 7C are formed sequentially from their lower side, and the sheets 110 on which the test patterns have been formed are conveyed to the inversion unit 136 with the lower side in FIGS. 7A to 7C leading. At this time, the sensors SC1 to SC4 perform a pre-scan with detection of the pre-scan trigger patches acting as a trigger. Note that the pre-scan is performed in order to determine colorimetric measurement conditions such as accumulation time and the number of times averaging is to be performed in a main scan to be thereafter performed. The sheets on which the test patterns have been formed are conveyed to the inversion unit 136 after the pre-scan, and are subsequently conveyed to the conveyance path 135 with the upper side in FIGS. 7A to 7C leading. At this time, the sensors SC1 to SC4 perform colorimetric measurement on the colorimetric measurement patches and the check patches with detection of the main-scan trigger patches acting as a trigger. Note that colorimetric measurement is performed in accordance with the colorimetric measurement conditions determined through the pre-scan. The sensors SC1 to SC4 obtain color values of the colorimetric measurement patches and the check patches from the spectral reflectance of the colorimetric measurement patches and the check patches.

The printer controller CPU 313 first determines whether or not predetermined conditions regarding the intra-sheet difference, the inter-sheet difference, and the inter-sensor difference are satisfied based on the color values of the check patches #1 to #13. FIG. 11 shows an example of these conditions. In this embodiment, as shown in FIG. 11, the intra-sheet difference is checked based on the color difference between the check patches #1 and #3 that are formed in the same column within the same sheet and accordingly subjected to colorimetric measurement by the same color detection sensor 200. Specifically, the printer controller CPU 313 determines a chromaticity 1 of the check patch #1 from the spectral reflectance information regarding the check patch #1, determines a chromaticity 3 of the check patch #3 from the spectral reflectance information regarding the check patch #3, and determines a color difference ΔE based on the chromaticity 1 and the chromaticity 3. If the color difference between the check patches #1 and #3 is smaller than or equal to a threshold value, that is, 1.6 or smaller in FIG. 11, it is determined that the intra-sheet difference is within an allowable range. If a sheet has flapped, the chromaticity 1 of the check patch #1 or the chromaticity 3 of the check patch #3 is a value different from the chromaticity corresponding to paper white, and therefore, the color difference ΔE is larger than the threshold value. In this embodiment, the inter-sheet difference is checked using the check patches formed at the same position on different sheets. Specifically, if the color difference between two check patches detected by the same color detection sensor 200 among the check patches #6 to #13 formed on the second and third sheets is smaller than or equal to a threshold value, that is, 1.6 or smaller in FIG. 11, it is determined that the inter-sheet difference is within an allowable range. If any sheet is folded, or the sensor is unclean, the chromaticity of the check patches on the different sheets varies. Therefore, folding of a sheet or an unclean sensor can be determined by obtaining the color difference between check patches on the sheets. Furthermore, in this embodiment, a color difference between the average value of color values of the check patches #2 to #13 and the average value of the color values of the check patches #2 to #13 for each color detection sensor 200 is obtained, and if this color difference is smaller than or equal to a threshold value, that is, 0.8 or smaller in FIG. 11, it is determined that the inter-sensor difference is within an allowable range. In the case where a detection window of a color detection sensor 200 or the white reference plate is unclean as well, the color difference between the average values of the check patches on each sheet differs. Therefore, the average value of the chromaticity of the check patches is obtained for each sheet, and if the color difference for each sheet is larger than a threshold value, an unclean detection window and white reference plate can be determined. Note that the check patch #1 on which the sensor SC2 performs colorimetric measurement is excluded from the average value processing because the check patch corresponding to the check patch #1 is not provided with respect to the sensors SC1, SC3, and SC4. However, a configuration in which the check patch #1 is included in the average value processing may be employed. Alternatively, a configuration may be employed in which, in order to specify a check patch having a large color difference to the average value, the color difference between the average value of the color values of the check patches #1 to #13 and the color value of each check patch is obtained, and it is determined whether or not this color difference is smaller than or equal to a threshold value, that is, 0.8 or smaller in FIG. 11. Note that the threshold value can be determined based on a permeable color difference index of grade AA or grade AAA provided by Japan Color Research Institute, for example. Note that an unevenness of approximately 1.0 exists in color difference within a sheet. Accordingly, in the case of calculating a color difference using the colorimetric measurement values themselves rather than using the average value of the color values of the plurality of check patches as for the intra-sheet difference and the inter-sheet difference, a configuration in which a threshold value of the color difference calculated using the colorimetric measurement values is set to be larger than the threshold value of the color difference using the average value may be employed, giving consideration to the unevenness within the sheet. For example, in this example, the threshold value for determining the intra-sheet difference and the inter-sheet difference is set to be larger than the threshold value for determining the inter-sensor difference by 0.8.

The reason for selecting a color signal value of 0% for the check patches is because, even if check patches are formed using the same color signal value, the amount of attached toner varies slightly among the plurality of check patches. To achieve an accurate test, the threshold values need to be set to small values. If the amount of attached toner varies slightly, there is a possibility that the color difference among the plurality of check patches exceeds the threshold values, and therefore, in the following description, the check patches are formed based on the color signal value of 0%. Note that a configuration in which the check patches are formed using a value larger than 0% as the color signal value may be employed, although the accuracy decreases. Furthermore, arrangement positions of the check patches are not limited to those shown in FIGS. 7A to 7C. For example, in order to check the intra-sheet difference, at least two check patches to be detected by the same color detection sensor need only be provided within the same sheet. In order to check the inter-sheet difference, a check patch to be detected by the same color detection sensor 200 need only be provided on at least two sheets with respect to each color detection sensor 200. Note that the reason why the check patches #1 and #3 are formed between a main-scan trigger patch and a pre-scan trigger patch is for causing the color detection sensor 200 to measure the check patches in a state where the conveyance rollers 2002 and 2004 are holding the sheet. If a sheet is not held between the conveyance roller 2002 and the conveyance roller 2004, there is a possibility that the sheet will flap. For this reason, the positions of the check patches #1 and #3 are determined such that the check patches are formed at positions in which the sheet reaches a measurement position in a state where the conveyance roller 2002 and the conveyance roller 2004 are holding the sheet. Note that a check patch that is formed on at least two sheets and detected by the same color detection sensor 200 may be configured to be formed at the same position on the respective sheets. Furthermore, in order to check the inter-sensor difference, the check patches to be detected by each color detection sensor need only be provided at close positions. In this example, each check patch is provided at the same position in the sheet conveyance direction.

Note that, in order to understand unevenness in conveyance, color patches, that is, any of the colorimetric measurement patches, the main-scan trigger patches, and the pre-scan trigger patches, may be located on the front side or the rear side, or both of these sides of the check patches in the sheet conveyance direction. This is because, if conveyance is performed unevenly, the color differences do not satisfy the conditions in FIG. 11 as a result of performing colorimetric measurement on a part of the color patches at the time of colorimetric measurement for the check patches, and accordingly, deterioration in the colorimetric measurement accuracy due to unevenness in conveyance can be detected. Note that, for example, a configuration in which two check patches are formed continuously may also be employed.

If a color difference that exceeds the threshold value exists, the printer controller CPU 313 displays a message indicating that a color difference exceeds the threshold value, on the operation panel 180. If a color difference that exceeds the threshold value exists, it is likely that the value of the measurement result obtained by the color detection sensor 200 is not correct. For this reason, there is a possibility that a tone jump occurs in the ICC profile generated based on this colorimetric measurement result. When a color difference that exceeds the threshold value exists, the printer controller CPU 313 does not generate or update the ICC profile. On the other hand, if a color difference that exceeds the threshold value does not exist, the multi-color table generation unit 308 updates or generates the ICC profile based on the result of colorimetric measurement performed on the colorimetric measurement patches in this test pattern.

Figure 8:
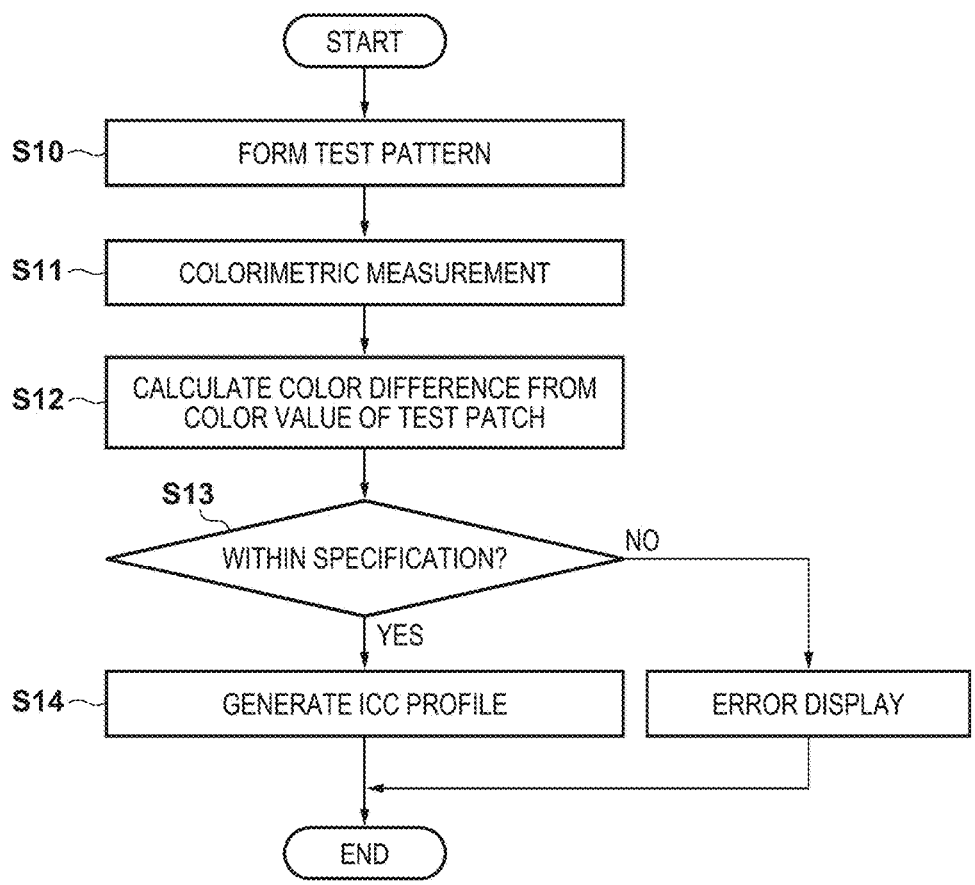
FIG. 8 is a flowchart of automatic hue correction according to an embodiment.

FIG. 8 is a flowchart of automatic hue correction according to this embodiment. Upon the user instructing the printer controller CPU 313 to execute automatic hue correction through the operation panel 180, the printer controller CPU 313 starts the processing in FIG. 8. In step S10, the printer controller CPU 313 forms the test patterns shown in FIGS. 7A to 7C on sheets. Note that, at this time, color processing of the color processing unit 315 is configured not to be performed. The printer controller CPU 313 acquires, in step S11, color values from the sensor SC1 to SC4, calculates, in step S12, respective color differences calculated from the color values of the check patches, and determines, in step S13, whether or not the respective color differences satisfy the conditions in FIG. 11. If the color differences satisfy the conditions, in step S14, the multi-color table generation unit 308 generates or updates the ICC profile. On the other hand, if there is a color difference that does not satisfy the conditions in FIG. 11, the printer controller CPU 313 displays, on the operation panel 180, a message indicating that an error has occurred in the automatic hue correction (colorimetric measurement result), that is, the conditions are not satisfied.

Note that, although the content displayed on the operation panel 180 may be only about whether or not an error has occurred in the automatic hue correction, displaying more detailed information can improve convenience for the user or a maintenance person. Specifically, a configuration in which the measurement result that exceeds the threshold value and the value thereof are displayed may be employed. A configuration in which information regarding an item to be checked is displayed in accordance with the measurement result that exceeds the threshold value may also be employed. For example, a configuration may be employed in which, if an error has occurred in the result regarding the intra-sheet difference, a message indicating that the backup roller 2003 is to be inspected is displayed since it is likely that flapping has occurred. Furthermore, a configuration may be employed in which, if an error has occurred in the result regarding the inter-sheet difference, the sensor corresponding to the error is displayed, and a message indicating that the detection position, uncleanness, or the like of this sensor is to be checked, or a message indicating checking of whether or not a sheet is folded is displayed. Furthermore, a configuration in which a message indicating that the backup roller 2003 of the sensor corresponding to the error is to be inspected is displayed may be employed. Also, a configuration may be employed in which, if an error has occurred in the result regarding the inter-sensor difference, the sensor corresponding to the error is displayed, and a message indicating that the detection window of this sensor, the white reference plate 250, or the like is to be checked is displayed. For example, guidance for prompting the user to clean the detection window is displayed on a display unit of the operation panel 180. Furthermore, a configuration may be employed in which, if an error has occurred in a largest color difference, the sensor corresponding to the error is displayed, and a message indicating that the detection position, uncleanness, or the like of this sensor is to be checked, a message indicating that the backup roller 2003 of the sensor corresponding to the error is to be inspected, and the like is displayed.

As described above, according to this embodiment, in the automatic hue correction, the check patches, which are white solid portions, are provided at predetermined positions in the test patterns, and it is determined whether or not the colorimetric measurement accuracy has been maintained, based on the colorimetric measurement result regarding the check patches. If it is determined that the colorimetric measurement accuracy has been maintained, the ICC profile is created based on the colorimetric measurement result regarding the colorimetric measurement patches. On the other hand, if it is determined that the colorimetric measurement accuracy has not been maintained, an error message is displayed on the operation panel 180, and the ICC profile is not generated based on this colorimetric measurement result. With this configuration, the accuracy of the automatic hue correction is maintained, and the quality of the image to be formed is maintained.

Note that although this embodiment has described the test patterns for checking the intra-sheet difference, the inter-sheet difference, and the inter-sensor difference, the present invention is not limited thereto. For example, if a plurality of color detection sensors are used but the entire test pattern can be printed on one sheet, a configuration in which only the intra-sheet difference and the inter-sensor difference are checked may be employed. If the test patterns expand over a plurality of sheets but only one color detection sensor is used, a configuration in which only the intra-sheet difference and the inter-sheet difference are checked may be employed. That is to say, a configuration may be employed in which any of the intra-sheet difference, the inter-sheet difference, the inter-sensor difference, and the largest color difference, or any combination thereof is checked.

Second Embodiment

With the test patterns in FIGS. 7A to 7C, the main scan is started upon the main-scan trigger patches being detected. In this case, the check patches #1 and #6 to #13 that are arranged near the main-scan trigger patches are not readily affected by unevenness in the sheet conveyance speed. On the other hand, the check patches #2 to #5 that are arranged at positions distant from the main-scan trigger patches are readily affected by unevenness in the sheet conveyance speed. For example, as shown in FIG. 9A, at the time of the main scan, a colorimetric measurement patch located in the front of the check patch #2 is set as a colorimetric measurement patch C#1, and a colorimetric measurement patch located in the rear of the check patch #2 is set as a colorimetric measurement patch C#2. If the conveyance speed is high, there is a possibility that a part of the colorimetric measurement patch C#2 is subjected to colorimetric measurement at the timing of colorimetric measurement for the check patch #2. On the contrary, if the conveyance speed is low, there is a possibility that a part of the colorimetric measurement patch C#1 is subjected to colorimetric measurement at the timing of colorimetric measurement for the check patch #2.

For this reason, according to this embodiment, the color of the colorimetric measurement patches in the front and rear of the check patch is set to a color at a distant position in the color space. For example, as shown in FIG. 9B, the colorimetric measurement patch C#1 is formed of 40% cyan and yellow toner and 0% other color toners. This color is pale green, and is at a position in the second quadrant on the plane coordinates with complementary color axes a* and b* shown in FIG. 9C. On the other hand, the colorimetric measurement patch C#2 is formed of 40% magenta and yellow toner and 0% other color toners. This color is pale red, and is located at a position in the first quadrant on the plane coordinates with the complementary color axes a* and b* shown in FIG. 9C. Note that the check patch #2 is solid white, and is located at the origin on the plane coordinates with the complementary color axes a* and b* shown in FIG. 9C.

For example, if the conveyance speed increases and a part of the colorimetric measurement patch C#2 is subjected to colorimetric measurement at the timing of colorimetric measurement for the check patch #2, the color value of the check patch #2 is not at the origin but at a position in the first quadrant. On the other hand, if the conveyance speed decreases and a part of the colorimetric measurement patch C#1 is subjected to colorimetric measurement at the timing of colorimetric measurement for the check patch #2, the color value of the check patch #2 is not at the origin but at a position in the second quadrant. Accordingly, if the colorimetric measurement result regarding the check patch does not satisfy the conditions in FIG. 11, it can be determined whether or not a problem has occurred in the conveyance speed, based on the quadrant to which the color value of the check patch has moved.

Note that the color patches in the front and rear of the check patch may be configured not to be formed using black toner. This is to distinguish whether the reason why the conditions in FIG. 11 are not satisfied is due to unevenness in the conveyance speed or due to flapping of the sheet. For example, if the distance between the color detection sensor 200 and the sheet increases because the backup roller 2003 cannot sufficiently suppress the flapping, the brightness, that is, the value of L* of a detected color decreases. That is to say, if the value of L* is lower than the average value, it is conceivable that flapping has occurred due to a problem with the backup roller 2003. However, if black toner is used in the color patches in the front and rear of the check patch, it cannot be distinguished whether flapping has occurred or there is a problem in the conveyance speed. In the case of not using black toner in the color patches in the front and rear of the check patch, if the brightness is lower than the average value, it is likely that the sheet has flapped, and accordingly, the backup roller 2003 is subjected to a check. On the other hand, if the color value of the check patch has moved to the same quadrant as that of the color patch in the front and rear of the check patch, it is likely that the conveyance speed is uneven, and accordingly, the conveyance roller is subjected to a check. Accordingly, the item to be checked can be more specifically indicated for the user or the maintenance person based on the measure result. FIG. 12 shows an example of measure results, causes thereof, and content displayed on the operation panel 180.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158497, filed on Aug. 10, 2015, which is hereby incorporated by reference herein in its entirety.

What is claimed is:

1. An image forming apparatus comprising:
   an image processor configured to perform image processing to image data, and output the image data;
   an image former configured to form an image on a sheet based on the output image data;
   a conveyor configured to convey the sheet along a conveyance path;
   a sensor, provided in the conveyance path, configured to measure a test pattern on the sheet, the test pattern being formed by the image former; and
   a controller configured to:
   control the image former to form the test pattern on the sheet, the test pattern including measurement images, trigger images and blank areas in which the measurement images and the trigger images are not formed, wherein the test pattern includes a first measurement image, a second measurement image, a first blank area and a second blank area between a first trigger image and a second trigger image in a conveyance direction of the sheet, wherein the first blank area is between the first trigger image and the first measurement image in the conveyance direction, wherein the first measurement image is between the first blank area and the second blank area in the conveyance direction, wherein the second measurement image is between the second blank area and the second trigger image in the conveyance direction, and wherein the second blank area is between the first measurement image and the second measurement image;
   control the sensor to read, while conveying the sheet by the conveyor, the test pattern on the sheet;
   determine a conveyance error of the sheet based on a reading result of the test pattern by the sensor; and
   generate an image processing condition based on the reading result of the test pattern by the sensor, in a case where the conveyance error is not determined, wherein the image processing condition is used for the image processing.

2. The image forming apparatus according to claim 1, further comprising:
   a notification unit configured to notify of an error, in a case where the conveyance error is determined.

3. The image forming apparatus according to claim 1, wherein the controller skips the generating the image processing condition, in a case where the conveyance error is determined.

4. The image forming apparatus according to claim 1, further comprising a reversal mechanism configured to reverse the conveyance direction of the sheet,
   wherein the controller controls the conveyor to convey the sheet to a measurement position of the sensor, controls the sensor to read the test pattern on the sheet, controls the reversal mechanism to reverse the conveyance direction of the sheet, controls the conveyor to convey the sheet to the measurement position of the sensor again, controls the sensor to read the test pattern on the sheet again.

5. The image forming apparatus according to claim 1, wherein the controller determines the conveyance error based on a first reading data corresponding to the first blank area and a second reading data corresponding to the second blank area.

6. The image forming apparatus according to claim 1, wherein the controller decides a color difference based on first color data corresponding to the first blank area and second color data corresponding to the second blank area, and determines that the conveyance error occurs when the color difference is larger than a threshold.

7. An image forming apparatus comprising:
   an image processor configured to perform image processing to image data, and output the image data;
   an image former configured to form an image on a sheet, based on the output image data;
   a conveyor configured to convey the sheet along a conveyance path;
   a sensor, provided in the conveyance path, configured to measure a test pattern on the sheet, the test pattern being formed by the image former;
   a controller configured to:

control the image former to form the test pattern on the sheet, the test pattern including measurement images, trigger images, and blank areas in which the measurement images and the trigger images are not formed, wherein the test pattern includes a first measurement image, a second measurement image, a first blank area and a second blank area between a first trigger image and a second trigger image in a conveyance direction of the sheet, wherein the first blank area is between the first trigger image and the first measurement image in the conveyance direction, wherein the first measurement image is between the first blank area and the second blank area in the conveyance direction, wherein the second measurement image is between the second blank area and the second trigger image in the conveyance direction, and wherein the second blank area is between the first measurement image and the second measurement image;

control the sensor to read, while conveying the sheet by the conveyor, the test pattern on the sheet;

decide a color difference based on first reading data corresponding to the first blank area and second reading data corresponding to the second blank area;

generate an image processing condition based on a reading result of the test pattern by the sensor, in a case where the color difference is smaller than a threshold, wherein the image processing condition is used for the image processing.

8. The image forming apparatus according to claim 7, wherein the controller skips the generating the image processing condition, in a case where the color difference is not smaller than the threshold.

9. The image forming apparatus according to claim 7, further comprising:

a notification unit configured to notify of an error, in a case where the color difference is not smaller than the threshold.

* * * * *